A. J. BUSH.
DENTAL CHART.
APPLICATION FILED JUNE 13, 1919.
1,338,068.
Patented Apr. 27, 1920.
2 SHEETS—SHEET 1.
Fig. 1.
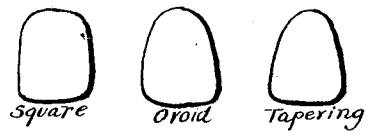
Fig. 2.
Fig. 4.
Inventor
Alden J. Bush
By
C. C. Shepherd
Attorney

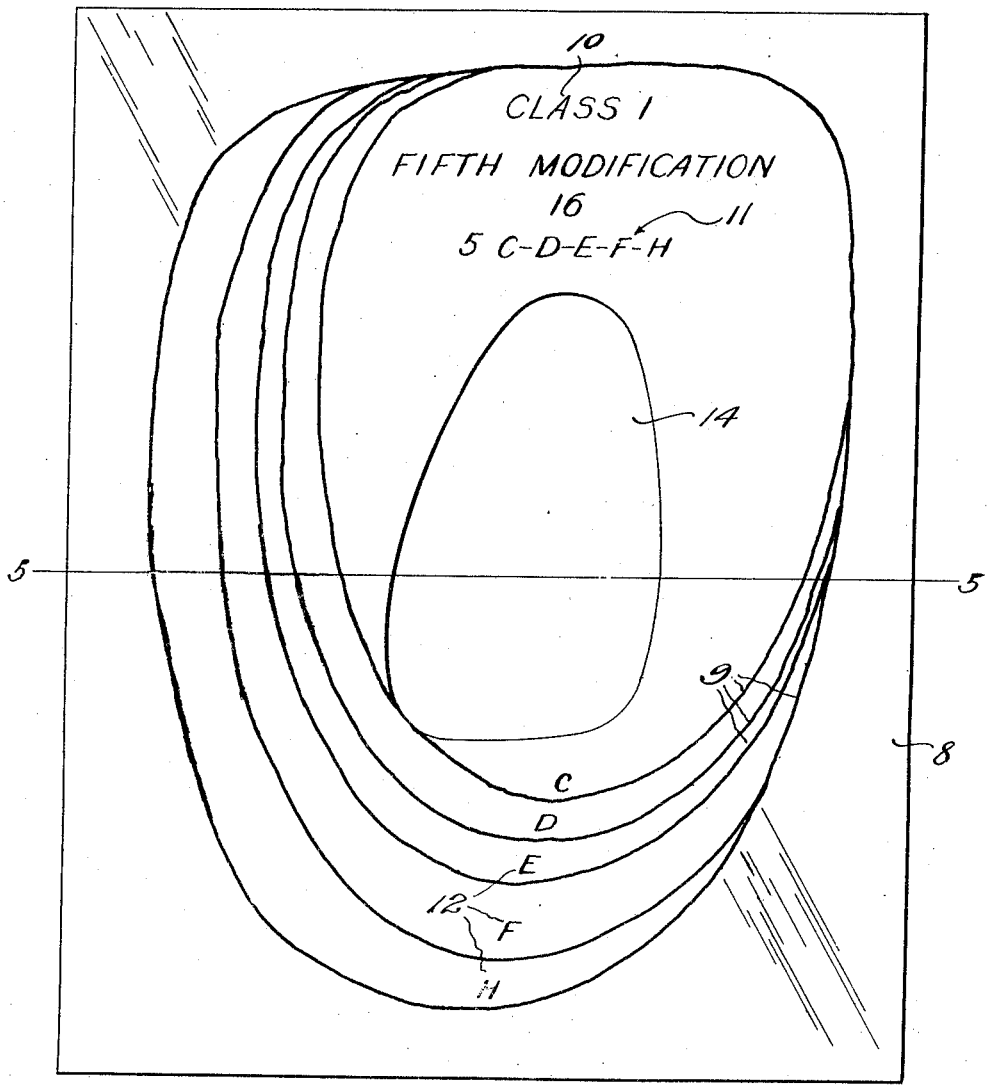

UNITED STATES PATENT OFFICE.

ALDEN J. BUSH, OF COLUMBUS, OHIO.

DENTAL CHART.

1,338,068.   Specification of Letters Patent.   Patented Apr. 27, 1920.

Application filed June 13, 1919. Serial No. 303,929.

*To all whom it may concern:*

Be it known that I, ALDEN J. BUSH, a citizen of the United States, residing at Columbus, in the county of Franklin and State of Ohio, have invented certain new and useful Improvements in Dental Charts, of which the following is a specification.

This invention relates broadly to dentistry and, with regard to its more specific features, has particular reference to an improved mechanical structure and method whereby a dentist will be enabled to readily and accurately select artificial teeth of proper mold or contour as will best conform to the facial outlines of the patient for whom the teeth are to be selected.

It is generally recognized in the dental profession that, broadly stated, the contour of the teeth of the human race may be categorically placed into three typal classes, commonly termed the square, tapering and ovoid forms, and it has been further found through the researches of Dr. J. Leon Williams that natural teeth possess contours which are related to the molds or contours of the human face. In other words, it has been found that the upper central incisor when inverted and proportionately enlarged is substantially that of the human face when the latter is in repose, and from this it also follows that the molds of the human face may also be classified into three general classes corresponding to the types above enumerated. Therefore, by comparing the mold or cast of a face, a dentist may readily determine the character or shape of a tooth best adapted to harmonize with the facial contour of the patient for whom the tooth is selected. Because this method of selection is so convenient and rapid, many dentists have adapted the same, and furthermore the same is thoroughly scientific and based upon sound and readily grasped principles. In view of the fact that this method broadly does not furnish the essence of the present invention a further discussion thereof is not deemed to be necessary but further understanding of the principles of this method may be gained by reference to the subject of prosthetic dentistry which has been treated in a very careful manner by many reputable scientists in recent text books bearing on the subject.

Therefore, the present invention resides essentially in the provision of a series of enlarged outlines representing reproductions of teeth which are charted or drawn upon transparent material, said outlines being enlarged to approximately equal the full proportions of the human face and which charts are adapted to be held in an inverted position before the face of a patient to enable the operator to view the outlines of the human face through the transparent material forming the chart, and in this manner to make comparison of said facial outlines with said enlarged outlines of the tooth forms drawn or charted upon said transparent material, whereby when said outlines approximately coincide a dentist may be assured upon reference to accompanying data that a tooth or teeth may be selected which will harmonize with the facial contour of the patient.

A further object in the invention resides in a method by virtue of which proper molds of artificial teeth may be accurately selected for any given facial contour by the use of enlarged outlines of the artificial teeth manufactured and supplied to dentists for use in the practice of dentistry, said outlines being charted or drawn upon transparent material and enlarged to substantially equal the size of the human face and which outlines, when held in an inverted position before the face of the patient, will enable the dentist to determine which of the several outlines of tooth forms, harmonize to the greatest degree of coincidence with the facial outlines of the patient, so that in this manner the dentist will be scientifically guided in the proper selection of teeth and the human tendency to error will be reduced to a minimum in the selection of teeth.

Another object of the invention resides in a chart of the above character wherein the enlarged outlines of the various tooth molds are appropriately lettered or numbered or otherwise properly designated to correspond with similar data used upon the various artificial teeth, this system of interchange being employed so that when a dentist has decided upon the proper outline, the tooth corresponding to such outline may be readily obtained by simply noting the designation of the selected outline and in selecting the artificial tooth corresponding thereto.

Still a further object of the invention resides in providing the charts with substantially central perforations or openings, whereby the same will be capable of receiving the nasal organs of the patients upon which the charts are fitted, in order that the charts may be placed in juxtaposition with respect to the face so that a careful comparison of outlines may be obtained.

Other objects will be in part obvious and in part pointed out hereinafter.

In the accompanying drawings, forming a part of this specification and in which similar characters of reference denote like and corresponding parts:

Figure 1 is a diagrammatic view disclosing the relationship which exists between the relative contours of the human face and that of the upper central incisor, the latter being proportionably enlarged, Fig. 2 is a grouped view showing the three typal forms of teeth, Fig. 3 is a plan view of the chart comprising the present invention, Fig. 4 is a grouped view of the artificial teeth contained in class 1 or the so called square type of teeth, and illustrating the several modifications of this particular class, and Fig. 5 is a horizontal sectional view.

The identity of the form of the upper central incisor with that of the facial outline of the human face is common to too large a proportion of the people to be accidental and too pleasing to be the result of chance. Careful study has shown that when this harmony exists, there is a coincidence of tooth forms and face forms, the dentures are pleasing, even though the tooth form, considered alone, may not be particularly fine. Furthermore, it shows also that when the tooth form is noticeably unlike the face form, the dentures are not pleasing, no matter how fine the tooth form, considered alone, may be.

As shown in Fig. 1 the diagram 6 on the face 7 outlines the portion of the face with which the inverted upper artificial central incisor should be identical in proportions and form as it has been clearly demonstrated that nature has harmonized the upper central incisor with the facial form and in order to be naturally and esthetically correct perfect teeth should be so selected.

In order to aid a dentist in analyzing the facial form so that the selection of teeth may be facilitated, the present invention provides a plurality of charts 8. These charts are preferably formed from a suitable transparent or translucent material and have suitably designated thereon a plurality of outlines 9 which correspond to enlarged reproductions of tooth forms, and portray the forms in inverted positions. As is stated above teeth may be divided generally into three broad classes as shown in Fig. 2, and it will be apparent that the classes are further sub-divided into numerous forms all of which form the modifications of the class in which they are placed, and each modification clearly denotes the form to which it is inherent. Fig. 4 sets forth the several modifications of class 1, or the so called square type, and for purposes of identification each tooth composing this class is characteristically designated, in this instance by the combination of numbers and letters. The remaining groups or classes also possess similar modifications which, owing to the showing set forth in Fig. 4 are not believed necessary to illustrate.

In practice, the charts 8 are marked as at 10 to set forth the class of teeth which their outlines 9 represent and are further marked as at 11 to indicate the diagrams of the several teeth composing a sub-group. For instance, the chart 8$^a$ has each of its diagrams C, D, E, F and H clearly lettered as at 12, and similar indications 13 are provided upon the teeth shown in Fig. 4. Hence if it has been found that the outline $d$ best conforms with the facial outlines of a patient, the tooth corresponding to this outline may be readily identified by referring to the tooth containing an identifying mark similar to the outline $d$. Thus, the teeth contained in class 1 are sub-grouped into classes 1, 2, 3, 4 and 5, each of which sub-group being designated by a suitable number and the individual teeth composing each sub-group by a suitable letter.

By placing the charts 8 in juxtaposition with respect to a patient's face, the outlines 9 will be so positioned that the dentist may readily observe if any one of the same coincide with the facial outlines of the patient, and tests may be repeated until the proper class has been determined and further tests until the precise modification of each particular class has been secured. By forming the charts with central perforations or openings 14 the same may be placed relatively close to the face of the patient on account of the fact that the nose is permitted to pass through the perforations 14 and in this manner the chart itself may be placed directly upon the face. After the proper outline has been determined, the same is identified by noting its distinguishing indicia, and then a tooth is selected corresponding to the indicia designating the particular selected outline.

In view of the foregoing it will be perceived that the present invention provides means whereby a dentist may, in a substantially mechanical manner, observe the outlines of a patient's face and compare the same with enlarged reproductions of outlines representing tooth molds, whereby when the outlines coincide the same may be identified and teeth selected which will best harmonize in a natural manner with the needs of the patient.

What I claim is:

1. A chart for dentists, comprising a sheet of substantially transparent material having an outline designated thereon representing the inverted contour of a tooth enlarged to substantially the size of a human face, whereby when the sheet is placed in close relation with a human face the outline resemblance of the latter with respect to the tooth outline designated upon said chart may be determined.

2. A chart for dentists comprising a sheet of substantially transparent material having a plurality of outlines portrayed thereon representing tooth formations, the central portion of said chart being apertured to accommodate the latter to the human face, whereby the mold or cast of the face may be determined by comparison with the outlines contained upon said chart.

3. A chart for dentists comprising a substantially transparent member having a plurality of outlines portrayed thereon representing sub-class modifications of a typal class of teeth in inverted position enlarged to substantially the size of the human face, and means whereby each outline may be individually identified.

4. A chart for dentists comprising, in combination, a substantially transparent member having a plurality of outlines portrayed thereon representing inverted images of tooth molds, means whereby each of said outlines are individually identified, and a second chart having substantially all of the teeth of a typal class represented thereon enlarged to substantially the size of the human face and each of said teeth being individually identified, related outlines and teeth having corresponding and similar indicia.

5. A chart for dentists comprising a plurality of substantially transparent members having a plurality of outlines portrayed thereon representing enlarged and inverted reproductions of tooth molds, identifying indicia for each of said outlines, and means whereby said members may be placed in contact with the face.

6. A method for facilitating the selection of artificial teeth, consisting in matching the outlines of the human face with corresponding outlines representing tooth formations inverted and enlarged to substantially the size of the human face, whereby upon the registration of said outlines the properly shaped tooth corresponding to said outlines may be selected.

7. A method for facilitating the selection of artificial teeth, consisting in matching the general outlines of the human face with a member containing outlines representing inverted enlargements of tooth formations whereby upon the registration of a member outline with the outline of the face tooth forms may be accordingly noted, and in identifying each of said outlines to correspond with indicia contained upon artificial teeth, whereby a tooth may be selected upon noting the identifying indicia upon the registering outline.

8. A chart for dentists, comprising a sheet of substantially transparent material having a plurality of outlines portrayed thereon representing enlarged distinguishing characteristics of tooth formations in inverted position, whereby said outlines may be placed in such relation with respect to the human face as to permit of a relative comparison between said chart outlines and the facial outlines.

In testimony whereof I affix my signature.

ALDEN J. BUSH.